US 10,935,187 B2

(12) United States Patent
Armitage (10) Patent No.: US 10,935,187 B2
(45) Date of Patent: Mar. 2, 2021

(54) REMOTE CONTENTS MONITORING

(71) Applicant: Eagle Field Tech, Inc., Denver, CO (US)

(72) Inventor: David L. Armitage, Golden, CO (US)

(73) Assignee: EAGLE FIELD TECH, INC., Denver, CO (US)

( * ) Notice: Subject to any disclaimer, the term of this patent is extended or adjusted under 35 U.S.C. 154(b) by 0 days.

(21) Appl. No.: 15/898,467

(22) Filed: Feb. 17, 2018

(65) Prior Publication Data

US 2018/0238495 A1 Aug. 23, 2018

Related U.S. Application Data

(60) Provisional application No. 62/460,305, filed on Feb. 17, 2017.

(51) Int. Cl.
*F17C 13/02* (2006.01)
*G01F 9/00* (2006.01)
*G01F 23/00* (2006.01)
*G01F 23/284* (2006.01)

(52) U.S. Cl.
CPC ............ *F17C 13/028* (2013.01); *G01F 9/00* (2013.01); *G01F 23/0076* (2013.01); *F17C 2250/0621* (2013.01); *F17C 2250/0694* (2013.01); *F17C 2250/072* (2013.01); *G01F 23/284* (2013.01)

(58) Field of Classification Search
CPC ............ F17C 13/028; F17C 2223/0161; F17C 2250/032; F17C 2250/043; F17C 2250/0426; F17C 13/026; F17C 13/025; F17C 2223/033; F17C 2250/0439

USPC .......................................... 340/613
See application file for complete search history.

(56) References Cited

U.S. PATENT DOCUMENTS

| 5,983,198 A * | 11/1999 | Mowery ............... G06Q 10/08 705/22 |
| 6,662,643 B1 * | 12/2003 | Scott ................... G01F 23/0038 73/149 |
| 6,834,544 B2 * | 12/2004 | Scott ................... G01F 23/0038 73/149 |
| 6,922,144 B2 | 7/2005 | Bulin et al. |
| 6,947,584 B1 * | 9/2005 | Avila ...................... G06T 19/00 128/916 |
| 7,002,472 B2 * | 2/2006 | Stratmoen ............. G06Q 10/08 340/539.1 |
| 7,155,349 B1 | 12/2006 | Souluer |
| 8,301,517 B1 * | 10/2012 | Thue ..................... G06Q 10/083 705/28 |
| 8,600,149 B2 * | 12/2013 | Song ....................... G01N 23/04 378/57 |
| 10,173,573 B2 * | 1/2019 | Jones ....................... G01B 11/22 |

(Continued)

*Primary Examiner* — Jack K Wang
(74) *Attorney, Agent, or Firm* — Woods Oviatt Gilman LLP; Katherine H. McGuire, Esq.

(57) ABSTRACT

Systems and methods for remotely monitoring contents of a vessel in real-time. Along a shipping route, status of the contents (e.g., volume) is periodically and automatically transmitted to a remote user. A method includes determining volume of contents in a vessel at a first location along a route, determining volume of the contents in the vessel at a second location along the route, and comparing the two determined volumes. If the change in volume satisfies a preset threshold, then the method includes triggering a notification to a remote user.

26 Claims, 8 Drawing Sheets

(56) References Cited

U.S. PATENT DOCUMENTS

| | | | |
|---|---|---|---|
| 2006/0157149 A1* | 7/2006 | Hillam | B67D 7/348 141/198 |
| 2008/0134776 A1 | 6/2008 | Zhou et al. | |
| 2009/0266620 A1* | 10/2009 | Kallonen | G01G 19/12 177/139 |
| 2010/0089486 A1* | 4/2010 | Koeninger | B67D 7/3218 141/2 |
| 2011/0120589 A1* | 5/2011 | Evans | B67D 7/348 141/1 |
| 2011/0277546 A1 | 11/2011 | Armitage et al. | |
| 2014/0033774 A1* | 2/2014 | Ofchus | G07C 9/00571 70/264 |
| 2016/0358054 A1 | 12/2016 | Armitage et al. | |
| 2017/0154301 A1* | 6/2017 | Stevenson | G01F 23/14 |

\* cited by examiner

REMOTE CONTENTS MONITORING

CROSS-REFERENCE TO RELATED APPLICATION

The present application claims benefit of priority to U.S. Provisional Patent Application No. 62/460,305, entitled "REMOTE CONTENTS MONITORING" filed on Feb. 17, 2017, which is specifically incorporated herein by reference for all that it discloses or teaches.

BACKGROUND

For some cargo transporters, success or failure depends in part upon knowing the real-time status of the cargo being carried. For example, in the waste water hauling business, real-time knowledge of the load composition, volume and/or location is desired for efficient and reliable operations; for some loads, the load composition is regulated. To adhere to regulations, many transporters manually monitor the status of the cargo during transport. However, manual monitoring is subject to erroneous data recording and allows deceptive manipulation of the load data.

SUMMARY

Generally, the present disclosure provides systems and methods for remotely monitoring contents of a vessel, such as a bulk material transport vessel. Periodically along a shipping route, measurements of the contents (e.g., volume, composition) are collected and automatically transmitted to a remote device.

A method described herein includes determining volume of contents in a vessel at a first location, determining volume of the contents in the vessel at a second location, and comparing the two determined volumes. An alternate method includes determining volume of contents in a vessel at a first time, determining volume of the contents in the vessel at a second time, and comparing the two determined volumes. If the change in volume satisfies a preset threshold, then the methods include triggering a warning or notification. For both methods, the volumes can be determined by direct measurement or by a measurement and subsequent calculation that provides the volumes.

Provided herein is a volume monitoring system that includes a measuring module that has a sensor for determining volumetric data of contents in a vessel. The module includes memory and a processor, with the memory storing one or more applications that are executable by the processor. The measuring module further includes a communication system controllable by the processor to transmit the volumetric data across a network to a discrepancy notification module.

One particular implementation described herein is a method that includes receiving a first volumetric data measurement representing a first volume of contents from within a vessel at a first location along a route, receiving a second volumetric data measurement representing a second volume of the contents from within the vessel at a second location along the route, and determining (e.g., calculating) with a processor a volume change between the first volume and the second volume based on a differential between the first volumetric data and the second volumetric data. If the volume change satisfies a volume discrepancy, based on the calculated volume change, then the method includes triggering a notification to alert a user of a potential violation.

Another particular implementation described herein is a method that includes determining a first volume of contents in a vessel at a first location along a route and sending that first volume to a discrepancy notification module stored in memory and executable by a processor remote from the vessel, and then determining a second volume of the contents in the vessel at a second location along the route and sending that second volume to the discrepancy notification module.

Yet another particular implementation described herein is a system for remotely monitoring contents in a vessel. The system includes a discrepancy notification module stored in memory and executable by a processor. The discrepancy notification module is configured to compare a first received volumetric measurement of contents in a vessel to a second received volumetric measurement of contents in the vessel and determine a volume change. The discrepancy notification module is also configured to determine if the volume change satisfies a threshold, and, if it does, trigger a notification.

The disclosure also generally provides one or more computer-readable storage media of a tangible article of manufacture encoding computer-executable instructions for executing on a computer system a computer process. The computer process includes receiving a first volumetric measurement of contents in a vessel at a first location along a route, receiving a second volumetric measurement of the contents in the vessel at a second location along the route, determining a volume change between the first volumetric measurement and the second volumetric measurement, and if the volume change satisfies a threshold, triggering a notification.

Additionally, the methods and systems of this disclosure can be used for remotely monitoring the contents of a vessel based on the specific density of the contents. For example, from a measured specific density and measured volume, the weight of the contents can be determined; from this, it can be determined whether the load complies with road and bridge weight restrictions.

Although the discussion provided herein is directed to liquid contents and volumetric measurements, the systems and methods described herein are likewise applicable to solid loads, such as sand, gravel, grain, blasting media, etc. and to semi-solid or highly viscous loads such as concrete, bituminous products, waste or by-products from rendering plants, etc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWINGS

The described technology is best understood from the following Detailed Description describing various implementations read in connection with the accompanying drawings.

DETAILED DESCRIPTION

Provided herein are various systems, modules and methods for periodically remotely monitoring contents of a vessel, in real-time, and notifying a user if any discrepancy in the contents is found. The contents of a vessel, such as a tanker truck, can be monitored along a shipment route of the contents or over time. In some implementations, the methods of this disclosure include determining the volume of contents at a first location along the route, determining the volume of contents at a second location along the route, and comparing the two determined volumes, whereas in other implementations, the methods include determining the volume of contents at more than two locations along the route and comparing the more than two volumes. Additionally, the contents themselves may be monitored, to determine whether the contents have changed, e.g., chemically or physically.

Included in this disclosure are implementations of various methods, systems, modules, computer processes, computer-executable instructions, and computer-readable storage media encoding computer-executable instructions for executing the methods and/or processes.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Figure 1:
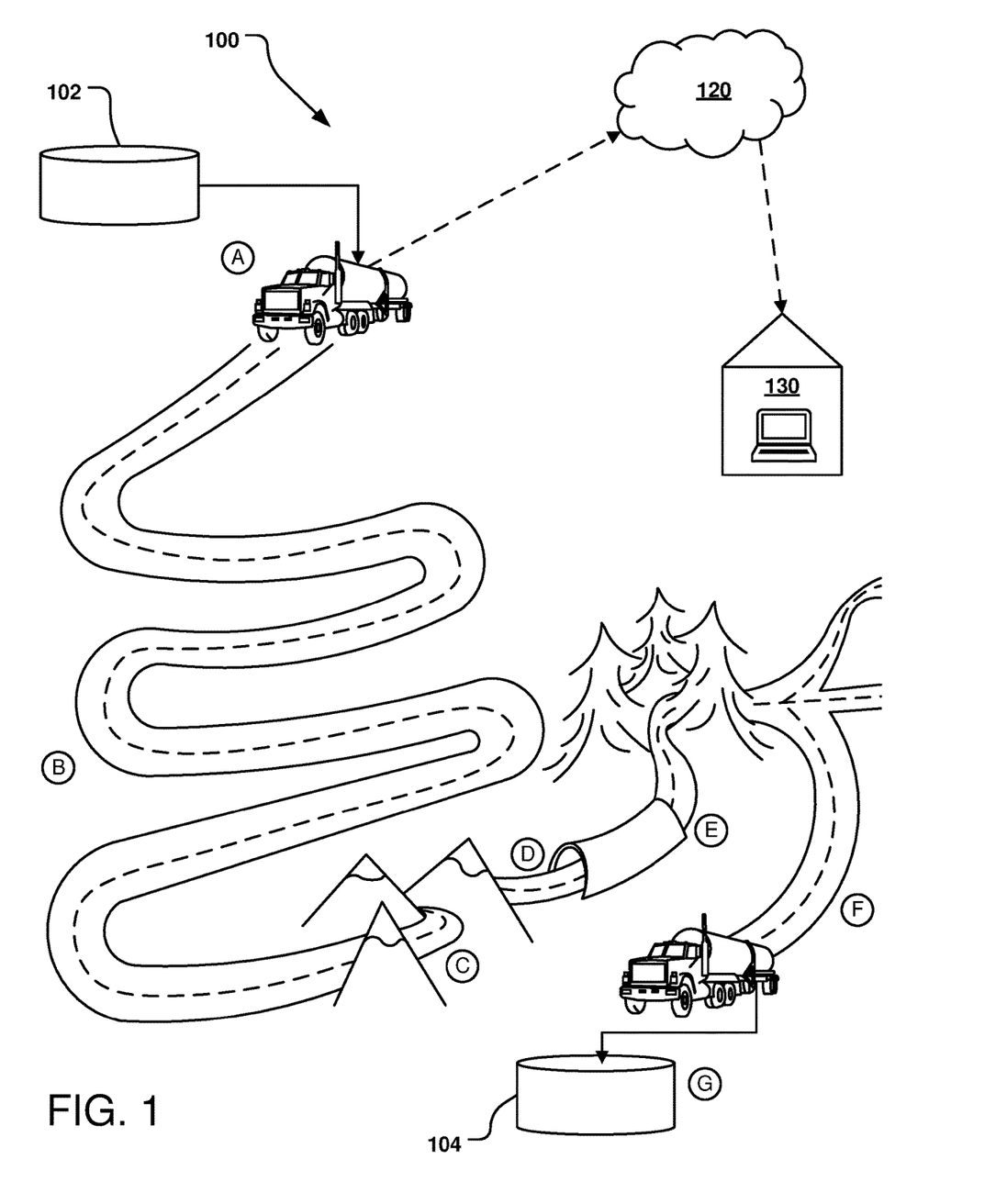
FIG. 1 is a schematic diagram of an example route for a vessel.

FIG. 1 illustrates an example route that a cargo vessel, such as a tanker truck, bulk material transport or other vehicle 100, might follow with a load of contents. Knowing the volume of the contents in the vessel along the route is highly beneficial; for example, if the volume decreases during the route, contents may have been removed or may have leaked out, and, for example, if the volume increases during the route, contents may have been added or there may be an access to the tank that allows rain to enter. For some loads, knowing the status of the contents, such as the composition of the contents or the physical state of the contents, is beneficial.

Turning to FIG. 1, at Location A, the tanker truck 100 accepts a load of contents from a storage tank 102 into its cargo vessel. In this example, the contents from the tank 102 are liquid, and can include aqueous product(s) and/or liquid hydrocarbons. As an example, the tank 102 stores waste water from an oil or natural gas drilling operations, the waste water being predominantly water with a small amount of oil or gas present. In alternate implementations, the waste water may be received directly from the drilling operation. Waste water from the tank 102 or other source is transported to a waste disposal site 104 by the tanker truck 100. The waste disposal site 104 may, for example, be highly regulated and charge a fee to accept the waste water, the fee being based on, e.g., volume and/or load composition.

The methods and systems of this disclosure are particularly beneficial to operations that produce or handle regulated waste water (e.g., oil or natural gas drilling operations, other operations that handle hazardous liquid waste, etc.). Depending on the specific region where the operation occurs (e.g., state, county, etc.), the disposal of the waste water is highly regulated, often including large fees to dispose of the waste water. The disposal fee may be paid by the entity producing the waste water, the entity hauling the waste water, or the individual driver of the vehicle hauling the waste water. It is not unknown to have waste water dumped improperly and illegally, to decrease or avoid altogether the disposal fee; often the hauling entity or the driver pockets the money that was not paid for the waste disposal. The methods and systems of this disclosure provide remote monitoring of the waste water, such as from the time it is loaded to prior to being dumped.

In accordance with at least one method of this disclosure, a measurement of the contents in the vessel of the tanker truck 100 is taken at a first location (e.g., Location A). In one implementation, the first location is proximate to a loading site and the measurement is performed immediately or soon after the tanker truck 100 has been loaded. The measurement may be a volume measurement, a depth measurement or other measurement from which the volume of liquid contents in the vessel can be determined. Accordingly, the term "volumetric data" is used herein to refer to either volume data or data from which volume can be derived.

The volumetric data is uploaded to a centralized computing system, via a network 120, and recorded. In some implementations, the volumetric data may be sent to a user at a remote location 130 by the network 120. In the particular implementation illustrated, the network 120 is a wide area network (WAN), such as a cellular network or RF network. In other implementations, the network 120 may be a local area network (LAN), such as Wi-Fi or BlueTooth.

In some implementations, a depth measurement of the contents in the tanker truck 100 is taken, from which the volume of the contents in the truck 100 is determined (e.g., calculated). In other implementations, the distance from a sensor to the contents in the tanker truck 100 is taken, from which the volume of the contents in the truck 100 is determined (e.g., calculated). A volume determination may be made from the measurement by appropriate techniques at the tanker truck 100 (as described below), after which the volume is uploaded to the network 120, or the measurement may be uploaded to the network 120 where an appropriate system determines the volume of the contents. In other implementations, the tanker truck 100 may have a volume gauge, so that the measured volume of the contents is the volumetric data and is uploaded to the network 120 without the need for any calculations.

After the first measurement is taken, the tanker truck 100 proceeds along its route to subsequent locations, labeled Location B, Location C, etc. in FIG. 1. The particular example route illustrated in FIG. 1 includes sharp corners near Location B, a mountain pass near Location C, a tunnel between Location D and Location E, a heavily wooded area between Location E and Location F, and the waste disposal site 104 at Location G. The locations may be recorded, e.g., on a map or in a database as mapping data.

At least one of the subsequent locations after Location A, such as Location B, Location C, etc., a subsequent measurement of the contents in the tanker truck 100 is taken, e.g., while the truck 100 is in motion, and the volumetric data is uploaded via the network 120. This second volume, from the second or subsequent volumetric data, is compared to the first volume from the first volumetric data, and any discrepancy between the volumes is identified. In some implementations, another subsequent measurement of the contents in the tanker truck 100 is taken and the volumetric data is uploaded via the network 120. This third volume can be compared to the first volume from the first volumetric data, and any discrepancy between the volumes is identified, and/or can be compared to the second volume and any discrepancy between the volumes is identified.

It is noted that a measurement taken after the tanker truck 100 has dumped the contents of its load at a waste disposal site 104 will not provide useful information, thus, any measurement taken for comparison should be taken while the contents are present in the truck 100, such as at Location F, immediately prior to the waste disposal site 104 at Location G.

Knowing the volume of the contents in the tanker truck 100 along the route is highly beneficial for tracking the status of the contents. By taking multiple measurements periodically along the route, the location or area where a discrepancy in volume occurs can be readily determined. For example, if a discrepancy (e.g., minor loss of volume) commonly is seen between Location A and Location B, for all trucks taking that route, one can deduce that the winding route affects the contents, e.g., the contents are conducive to sloshing or spilling out. As another example, if a discrepancy (e.g., large loss of volume) is seen between Position E and Position F, which includes a heavily-wood area with many side roads, one can deduce that contents might be illegally being dumped by the truck. As another example, if the volume of the contents slowly decreases at every subsequent location where a measurement is made, one can deduce that the truck has a leak. As yet another example, if the composition of the contents changes at Location C, one can deduce that the lower pressure and/or cold temperatures at the mountain pass have affected the contents. As yet another example, if the volume of the contents increases at Location C compared to Location B, but then decreases again at Location D, one can deduce that the contents have expanded in volume due to the higher altitude; with this knowledge, one will know not to fill the truck completely, knowing that the volume will expand en route.

If any of these discrepancies is noted repeatedly for one truck, no matter who the driver is, it is thus known that the loss of volume of contents is due to the truck, whereas if such a discrepancy is only noted for one driver, on one or multiple trucks, it is thus known that the loss of volume of contents is due to the driver. If the discrepancy is noted for essentially all trucks, for essentially all drivers, it is thus known that the loss is due to the nature of the route.

As another example of a benefit of knowing the volume of contents in a vehicle along the route, if, at a location (e.g., Position D), it is known that the truck 100 is not full and can accommodate additional product, the truck 100 can be rerouted, e.g., to pick-up additional contents to fill the load.

Figure 2:
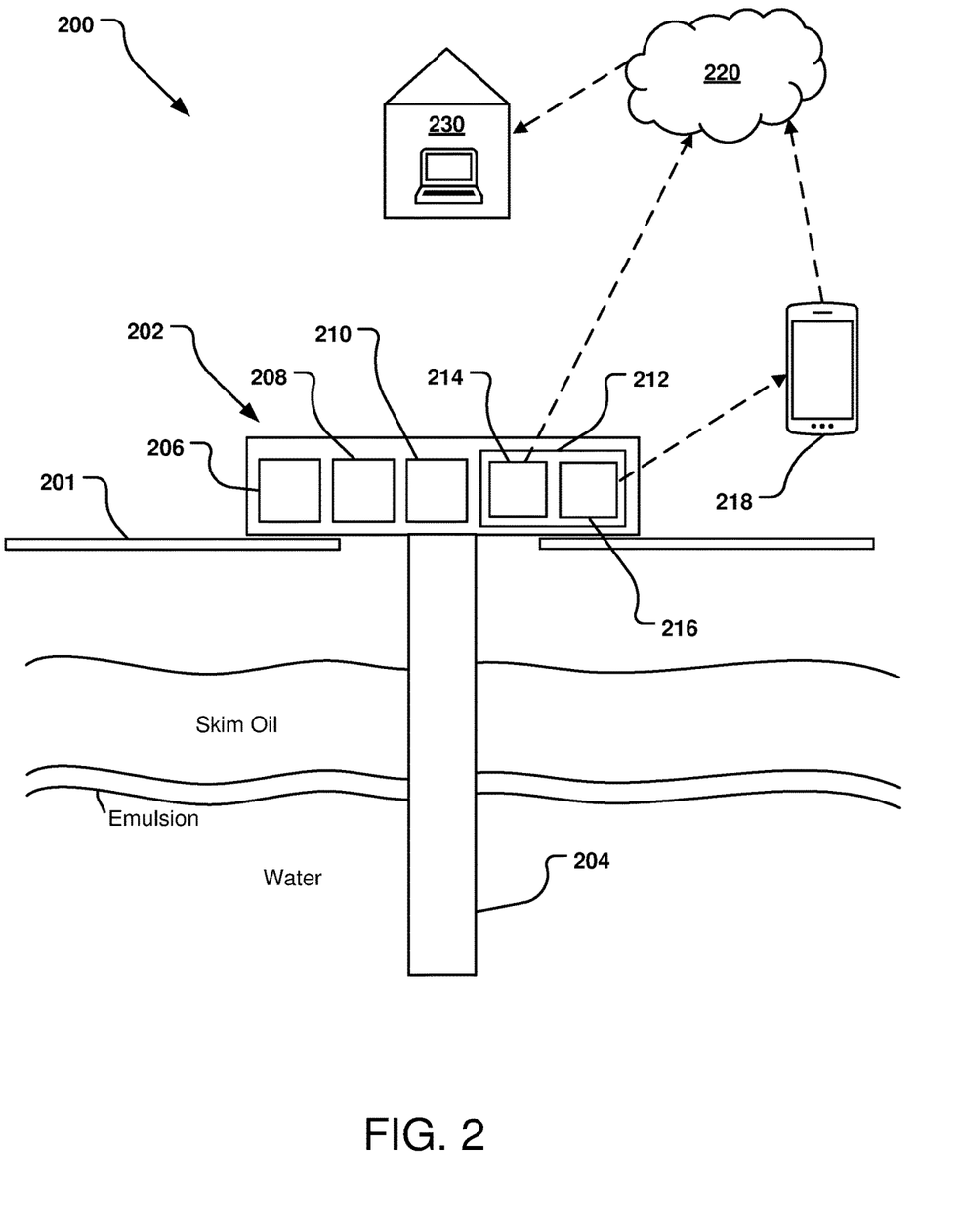
FIG. 2 is a schematic diagram of an example measuring device for determining the contents in a vessel.

FIG. 2 shows an exemplary monitoring system 200 for monitoring contents in a vessel. The system 200 includes at least a device 202 for determining the volume of contents in a vessel 201 (e.g., a tanker truck) and the location of the vessel 201 when the data is taken, and an appropriate communication mechanism to transmit the volumetric data. The device 202 is configured to seat within a port or aperture in the wall (e.g., top wall) of the vessel 201 to facilitate direct content between a sensor 204 of the device and the contents within the vessel 201. In other implementations, the device may be on the exterior of the vessel 201 without physically extending in to the vessel 201.

The device 202 includes the sensor 204 that operably extends into the vessel 201 for determining the status (e.g., level) of liquid contents in the vessel. An example of a suitable sensor 204 is a guided wave radar, which determines the level of a liquid based on physical contact with the liquid; a guided wave radar is capable of determining the level of multiple, layered liquids, by differentiating between the different liquids based on their dielectric constant. Another example of a suitable sensor 204 is a non-contact sensor, using, e.g., radio waves, to determine the level of the liquid. Depending on the particular type of the sensor 204, the device 202 may be able to determine the volume of two or three different liquids in the vessel 201, e.g., water, oil, and an emulsified mixture thereof. Also, depending on the particular type of the sensor 204, the device 202 may be able to determine the physical state of the contents, e.g., whether water has frozen or is starting to freeze.

The device 202 includes a location system 206, such as a GPS, GLONASS or other location system, to determine the location of the device 202. With the location provided by the location system 206, the measurement from the measurement device 202 can be correlated to the location on the route.

The device 202 includes a processor 208 to, e.g., initiate a measurement, initiate location determination, calculate the volume from the measurement, keep time, etc., based on instructions from various modules in the device 202. Information such as volumetric data and location, as well as the instructional modules, are stored in memory 210.

The device 202 may optionally include one or more tools to provide further information about properties of the contents in the vessel 201, particularly while the vehicle is in motion, such as to provide information about whether the contents have shifted in a manner that may impact the measurement collected by the sensor (e.g., if the vehicle is ascending or descending a steep incline, thus shifting the contents). For example, the device 202 may include a motion sensor, orientation sensor, or an array of sensors, to more precisely track the movement, orientation, and/or location of the vessel 201. For example, the device 202 may include, e.g., an accelerometer, a gyroscope, gravimeter, and/or a pressure sensor. Other examples of tools that the device 202 may have is a sensor to indicate if the device 202 is not properly seated on the vessel 201 or a sensor to indicate if an access cap into the vessel 201 is open. In some implementations, discussed further below, the device 202 may include a sensor to measure the specific density of the contents in the vessel 201. Examples of such measurement devices include a hydrometer, pycnometer, vibrating element transducer, ultrasonic transducer, radiation-based gauge, and buoyant force transducer.

The device 202 also includes a communication system 212 to transmit the measurement data from the sensor 204 to a remote location 230 across a network 220. The communication system 212 can include a long-range communication system 214 for communicating across a wide-area network (WAN) (e.g., via a radio frequency (RF), cellular-based, or satellite-based system), that can be used to transmit the data from the sensor 204 to the remote location 230 via the network 220. Additionally or alternately, the communication system 212 can include a short-range communication system 216 for communicating across a local area network (LAN) (e.g., a Wi-Fi, a Bluetooth™ network, BLE (Bluetooth Low Energy) network) from the sensor 204 to a secondary device 218 such as the vehicle driver's cellphone 218, which can then transmit the data to via network 220 to the remote location 230.

At the remote location 230, volumetric measurement data collected from the device 202 is analyzed to determine if a volumetric discrepancy exists between different volumetric data points and/or locations along the route.

In some implementations, the volumetric measurement data may be sent to and analyzed at the cellphone 218, rather than being sent to the remote location 230.

Figure 3:
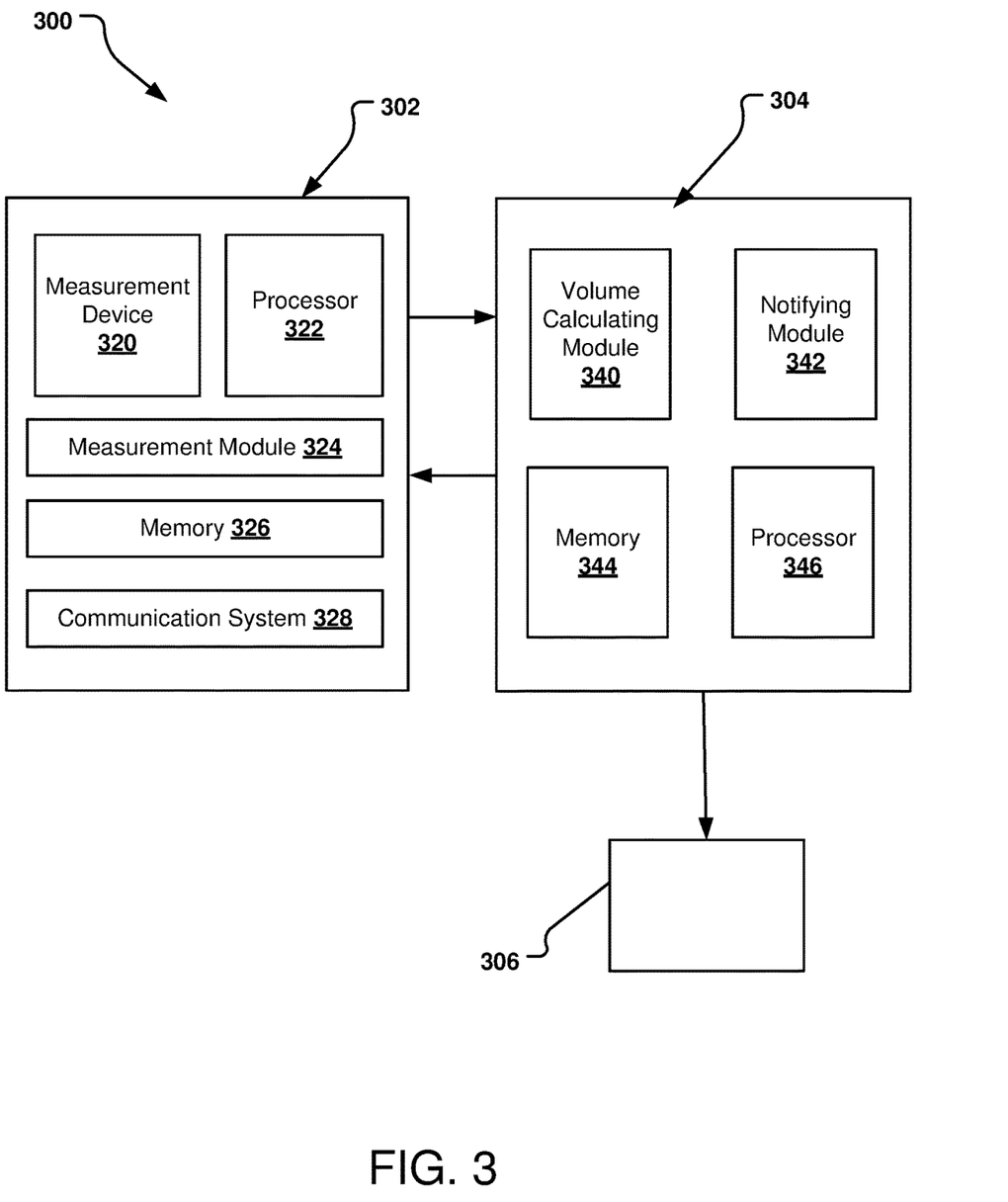
FIG. 3 is a schematic diagram of a system for monitoring vessel contents and issuing a notification responsive to vessel contents.

A system for monitoring vessel contents and issuing a notification responsive to vessel contents is generically shown in FIG. 3 as a remote contents monitoring system 300. The remote contents monitoring system 300 has a measuring system 302, a discrepancy notification system 304, and a notification receiver 306. Each of the measuring system 302, the discrepancy notification system 304, and the notification receiver 306 has appropriate processor(s), memory, circuitry, hardware and software to implement its respective functions.

The measuring system 302, which generally correlates to the device 202 of FIG. 2, is operably positioned on or in the vessel being monitored and is configured to determine a measurement of contents in the vessel and communicate that data to the discrepancy notification system 304. The measuring system 302 is operably connected to the vessel contents, to obtain volumetric data regarding the contents, which it sends to the discrepancy notification system 304. The measuring system 302 may send (raw) measured data or may send data that has been manipulated, e.g., volume calculated from a measurement. In some implementations, the measuring system 302 also sends location information, regarding the physical location where the data was obtained, to the discrepancy notification system 304.

The measurement system 302 includes a measurement device 320 such as a sensor configured to detect the status of contents in the vessel (e.g., the same or similar to the sensor 204 in FIG. 2). The status may be the volume of the contents (e.g., liquid(s)) in the vessel, the chemical properties of the contents in the vessel, and/or the physical properties of the contents in the vessel. Devices other than a sensor can alternately be used to detect the status of the contents in the vessel, as long as they can be controlled to detect the status of the contents. The measurement device 320 may include a location system (e.g., the same or similar to the location system 208 in FIG. 2).

The measurement system 302 includes a processor 322 operably connected to the measurement device 320 to control the measurement device 320 to take a measurement, for example, at a particular location when determined by a location system in the device 320. In other implementations, the measurement is not based on a particular location but on elapsed time. A measurement module 324 present in memory 326 provides instructions to the processor 322 for taking the measurement. The measurement module 324 may, in different implementations, be executable to take different types of measurements and/or manipulate the measurement (s) to compute the volumetric data (e.g., take a depth measurement and calculate a volume from that measurement). The measurement and/or location from the measurement device 320 and/or calculated volume are at least temporarily saved in the memory 326.

A communication system 328 is configured to access the memory 326, retrieve the stored volumetric data and location data and transmit the data to the discrepancy notification system 304. The communication system 328 includes appropriate circuitry, software and/or hardware for communicating across a wide-area network (WAN) and/or for communicating across a local area network (LAN). The communication system 328 is configured to ultimately communicate with the discrepancy notification system 304.

The discrepancy notification system 304 is configured to determine if the volumetric data received from the measuring system 302 indicates that a volume change has occurred that exceeds a predetermined threshold. If the volume change does exceed the threshold, the discrepancy notification system 304 produces a notification such as a warning.

The discrepancy notification system 304 includes a volume calculating module 340 and a notifying module 342 present in memory 344. The volume calculating module 340 is executable by a processor 346 to calculate a volume difference from the volumetric data received from the measuring system 302. The volume calculating module 340 compares that change in volume to a predetermined threshold and saves the determination in memory 344. This calculated volume difference is then provided to the notification module 342 to determine whether the calculated volume difference is of a magnitude that satisfies a predetermined threshold. If the measured volume is of a magnitude that exceeds the predetermined threshold, the notifying module 342 transmits a warning that the measured volume change is outside of the allowed threshold.

In some implementations, to decrease the opportunity of false warning, the discrepancy notification system 304 may be configured to transmit a notification if two or more measurements are not within an acceptable amount of a prior measurement. Additionally, the discrepancy notification system 304 may be configured to correlate the volumetric data to the location where measured; this may be beneficial, for example, if the volumetric data was taken at the disposal site (e.g., disposal site 104 in FIG. 1) after the contents had been removed from the vessel. In implementations where the volumetric data is at the disposal site, such reading may not be used as a basis for a warning notification.

The discrepancy notification system 304 is, in one implementation, located at a location remote from the vessel being monitored and remote from the measuring system 302. For example, the discrepancy notification system 304 may be located on a network server that is connected to the measuring system 302 or relayed from the measuring system 302 via, e.g., RF, satellite, or cellular communication. If the calculated volume difference exceeds the predetermined threshold, the notification system 304 relays the warning that the volume change of the contents is outside of the allowed threshold to the notification receiver 306. If the calculated volume difference is within the allowable threshold, the notification system 304 may relay an 'acceptable' or 'ok' notification or may relay no notification to the notification receiver 306.

The notification receiver 306 is configured to alert a user of the warning notification from the discrepancy notification system 304. The notification receiver 306 may be, for example, a cell phone, a tablet, a computer, etc.; in some implementations, the notification receiver 306 includes a display module to visually display the notification received from the discrepancy notification system 304. The warning may be a textual error message, a light, an audible tone, or any combination thereof.

Figure 4:
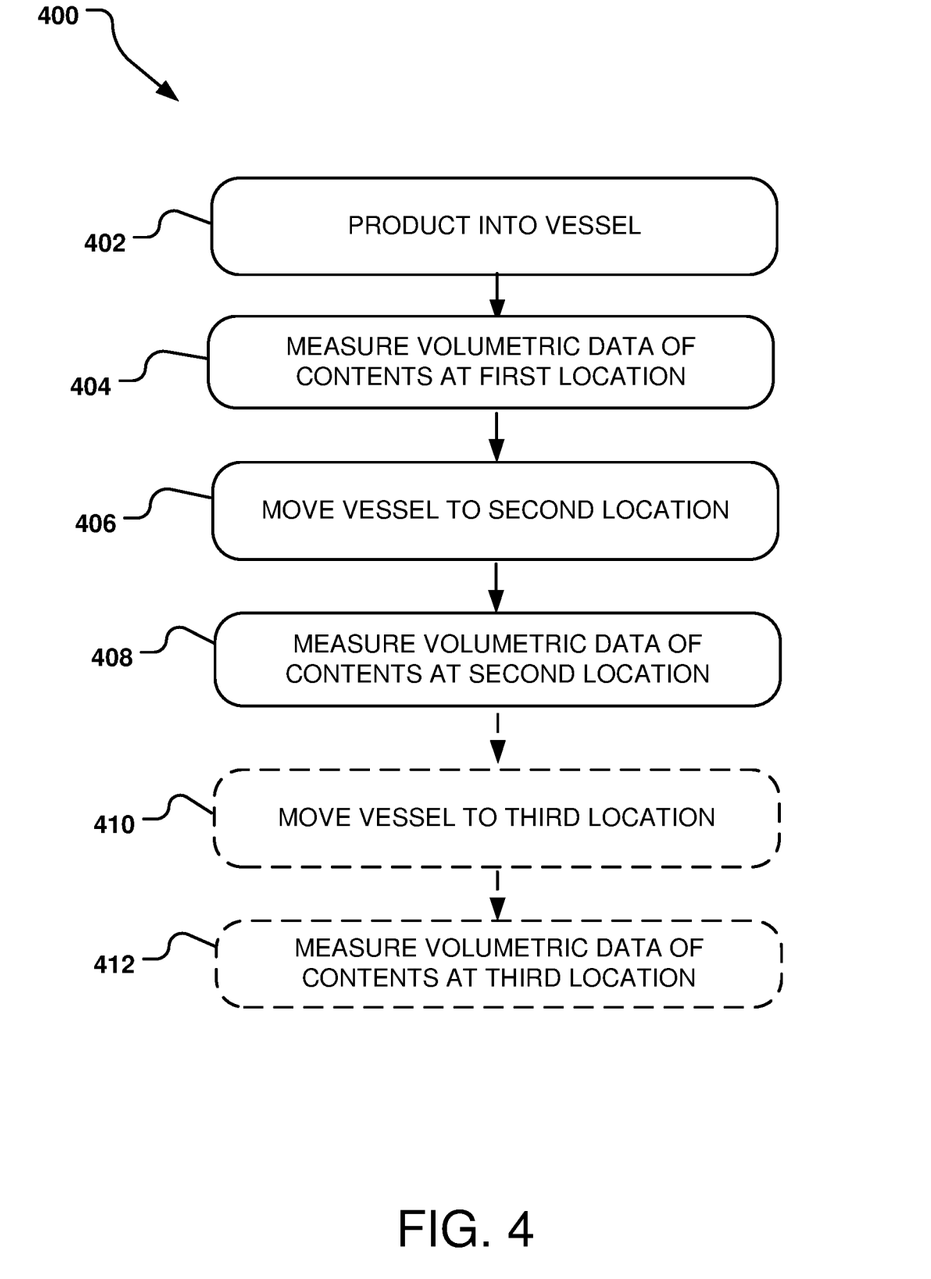
FIG. 4 is a step-wise flow chart of an example method of monitoring vessel contents.

FIG. 4 is a flow diagram of an example method 400 for monitoring the level of product (e.g., liquid) in a vessel. In operation 402, the product is placed into the vessel; this product is the "contents" of the vessel. In operation 404, which is done at a first location, volumetric data of the contents is measured; the volumetric data may be volume of the contents or may be measurement (e.g., depth) to the volume of the contents. In some implementations, two or more liquid products or contents may be in a same reservoir of the vessel, and volumetric data for each contents is determined; for example, FIG. 2 illustrates how both oil and water can be in a vessel. The first location, where the volumetric data of the contents is measured, may be the same as or different than the location where the product or contents is placed into the vessel. In operation 406, the vessel is moved to a second location different than the first location. In operation 408, the volumetric data of the contents is measured at that second location. The method 400 may include any number of subsequent movement and measurement operations; for example, the method 400 may include an operation 410, where the vessel is moved to a third location different than the second location, and an operation 412, where the volumetric data of the contents is measured at that third location.

With a method such as the method 400, the contents of the vessel are monitored as the vessel moves from one location from another, advising a user if and where any volume change occurs.

Figure 5:
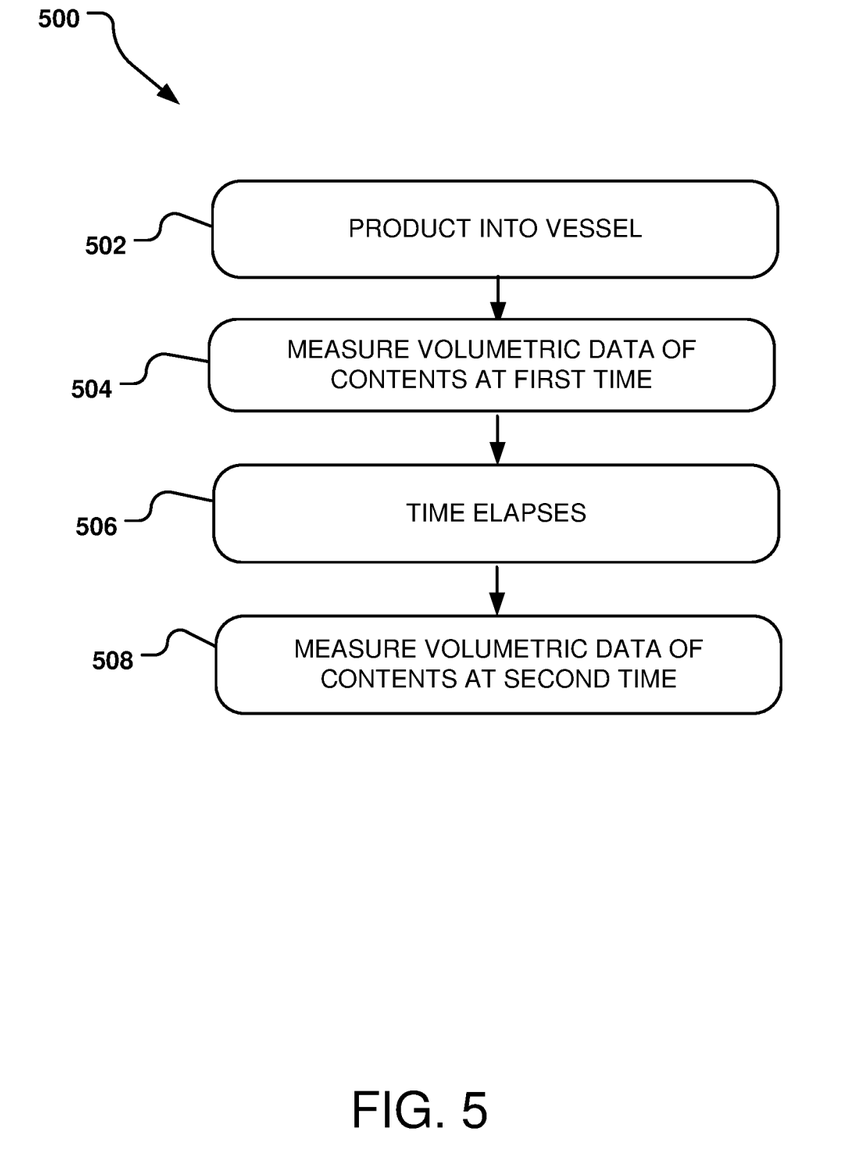
FIG. 5 is a step-wise flow chart of another example method of monitoring vessel contents.

FIG. 5 is a flow diagram of another example method 500 for monitoring the level of product (e.g., liquid) in a vessel. In operation 502, the product is placed into the vessel; this product is the "contents" of the vessel. In operation 504, which is done at a first time, the volumetric data of the contents is measured; this first time may be, e.g., immediately after the product or contents is placed into the vessel, or subsequent thereto. In some implementations, two or more products or contents may be in the vessel, and volumetric data of each content is measured. In operation 506, time elapses, so that in operation 508, which is a second time subsequent to the first time, the volumetric data of the contents is measured. As with the method 400, the method 500 may include any number of subsequent measurement operations over time.

With a method such as the method 500, the contents of the vessel are monitored over time, whether or not the vessel moves from one location from another, advising a user if and when any volume change occurs. A method such as the method 500 is useful to determine if the vessel has a leak that allows contents to exit the vessel (e.g., liquid contents to drip out), a hole that allows additional contents to be added to the vessel (e.g., a hole that lets rain water into the vessel), or if a person has been adding or removing contents from the vessel (e.g., when the vessel is stationary, such as overnight).

Figure 6:
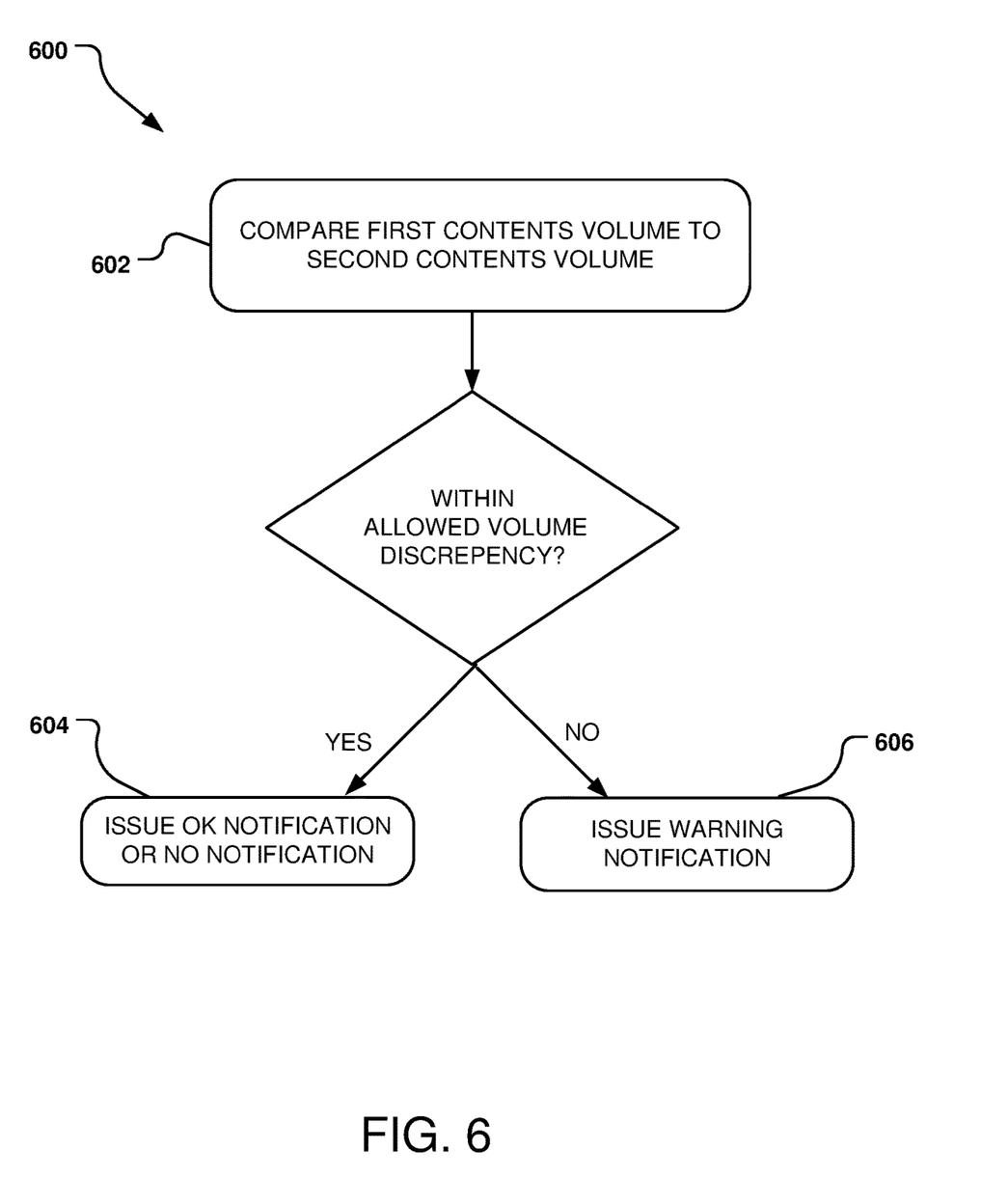
FIG. 6 is a step-wise flow chart of an example method of comparing the monitored vessel contents.

After the volume in the vessel has been monitored, e.g., based on location via the method 400 or over time via the method 500, the monitored volume is compared for any changes or discrepancies. A method 600, shown in FIG. 6, has a first operation 602 of comparing a first contents volume to a second contents volume, the second volume determined later in time or at a different location than the first volume. In this method 600, if the second volume is within a predetermined, allowed volume discrepancy or threshold of the first volume (either more or less), the shipment is acceptable. The allowable volume discrepancy may be percentage-based or may be a quantitative volume. In operation 604, either an "ok" or other "acceptable" notification is provided to the user, or no notification is sent. If the second volume differs (either more or less) from the first volume by more than the allowable volume discrepancy, the shipment is considered a potential violation. In operation 606, an error or other warning notification is provided to the user.

Figure 7:
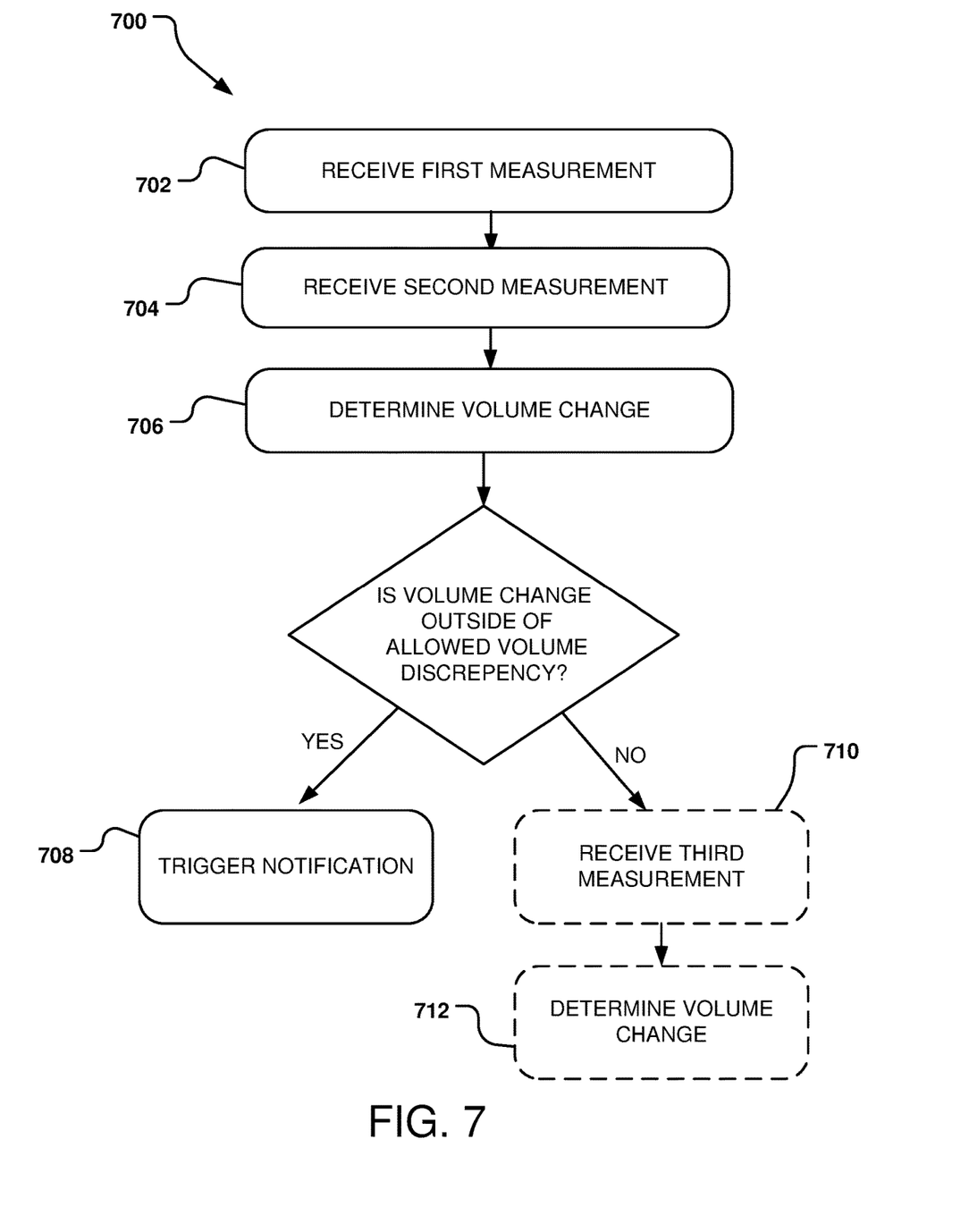
FIG. 7 is a step-wise flow chart of an example method of issuing a notification responsive to a change in vessel contents.

FIG. 7 is a flow diagram of a particular method of determining a volume at a discrepancy notification system, such as the discrepancy notification system 304 in FIG. 3.

In method 700 of FIG. 7, the discrepancy notification system receives, at operation 702, a first volumetric data measurement of contents from a vehicle at a first location along the route, and at operation 704, the discrepancy notification system receives a second volumetric data measurement of those contents. In operation 706, the discrepancy notification system determines a volume change between the first volumetric data measurement and the second volumetric data measurement, and if the volume change is outside of an allowed volume discrepancy, then triggering a notification at operation 708. If the volume change is within the allowable volume discrepancy, another volumetric data measurement is received in operation 710, and in operation 712 the discrepancy notification system determines a volume change between the third volume and either the first volume or the second volume.

Figure 8:
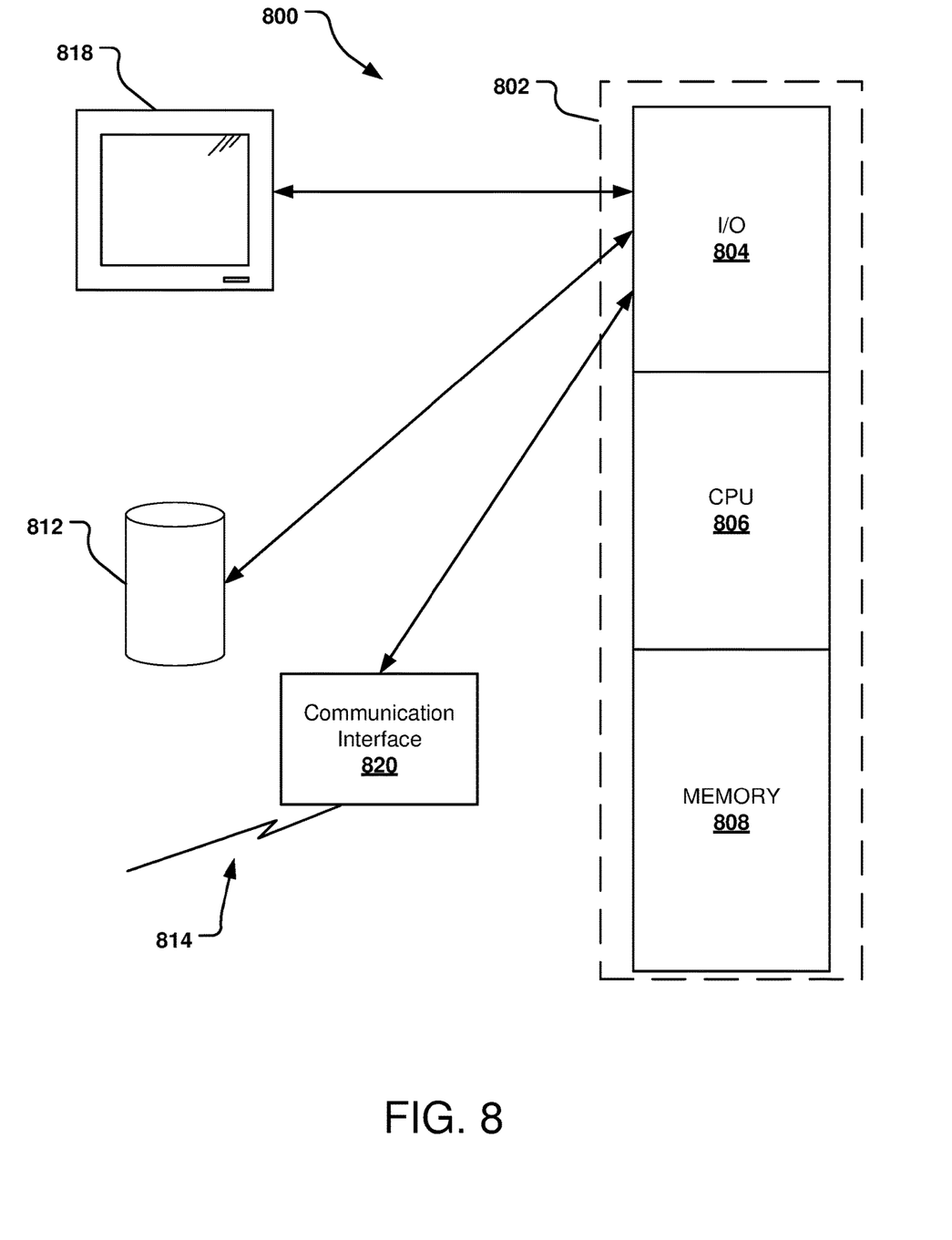
FIG. 8 is a block diagram of a computer system suitable for implementing one or more aspects of a system for monitoring vessel contents.

FIG. 8 shows a computer system 800 suitable for implementing one or more aspects of a system for monitoring contents in a vessel, such as the measuring system 302 and/or the discrepancy notification system 304 of the remote contents monitoring system 300 in FIG. 3. The computer system 800 is capable of executing a computer program product embodied in a tangible computer-readable storage medium to execute a computer process. As used herein, "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium that can be used to store the desired information and that can accessed by a computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Data and program files may be input to the computer system 800, which reads the files and executes the programs using one or more processors. Some of the elements of the computer system 800 are shown in FIG. 8; the system 800 has a processor 802 having an input/output (I/O) section 804, a Central Processing Unit (CPU) 806, and a memory section 808. There may be one or more processors 802 in the system 800, such that the processor 802 of the computing system 800 comprises a single CPU 806, or a plurality of CPUs 806. The processors 802, 806 may be single core or multi-core processors.

The computing system 800 may be a conventional computer, a distributed computer, or any other type of computer. The described technology is optionally implemented in software (modules) loaded in memory 808, a storage unit 812, and/or communicated via a wired or wireless network link 814 on a carrier signal (e.g., Ethernet, 3G wireless, 6G wireless, LTE (Long Term Evolution)) thereby transforming the computing system 800 in FIG. 8 to a special purpose machine for implementing the described operations.

The I/O section 804 may be connected to one or more user-interface devices (e.g., a keyboard, a touch-screen display unit 818, etc.) or a storage unit 812. Computer program products containing mechanisms to effectuate the systems and methods in accordance with the described technology may reside in the memory section 808 or on the storage unit 812 of such a computer system 800.

A communication interface 820 is capable of connecting the computer system 800 to a network via the network link 814, through which the computer system can receive instructions and data embodied in a carrier wave. When used in local area networking (LAN) environment, the computing system 800 is connected (by wired connection or wirelessly) to a local network through the communication interface 820, which is one type of communications device. When used in a wide-area-networking (WAN) environment, the computing system 800 typically includes a modem, a network adapter, or any other type of communications device for establishing communications over the wide area network. In a networked environment, program modules depicted relative to the computing system 800 or portions thereof, may be stored in a remote memory storage device. It is appreciated that the network connections shown are examples of communications devices for and other means of establishing a communications link between the computers may be used.

In an example implementation, any or all of the modules from the discrepancy notification system 304, such as the volume calculating module 340 and the notifying module 342 (from FIG. 3) are embodied by instructions stored in memory 808 and/or the storage unit 812 and executed by the processor 802.

One or more relational databases storing data used in comparing different measurements may be stored in the disc storage unit 812 or other storage locations accessible by the computer system 800. In addition, the computer system 800 may utilize a variety of online analytical processing tools to mine and process data from the databases. Further, local computing systems, remote data sources and/or services, and other associated logic represent firmware, hardware, and/or software, which may be configured to characterize and compare different locales. A monitoring system of this disclosure can be implemented using a general purpose computer and specialized software (such as a server executing service software), a special purpose computing system and specialized software (such as a mobile device or network appliance executing service software), or other computing configurations. In addition, any or all of the module(s) may be stored in the memory 808 and/or the storage unit 812 and executed by the processor 802.

The implementations described herein are implemented as logical steps in one or more computer systems. The logical operations of the present invention are implemented (1) as a sequence of processor-implemented steps executing in one or more computer systems and (2) as interconnected machines or circuit modules within one or more computer systems. The implementation is a matter of choice, dependent on the performance requirements of the computer system implementing the invention. Accordingly, the logical operations making up the implementations described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The previous discussion has provided numerous methods and systems for monitoring the volume of contents in a vessel. Knowing the real-time volume in the vessel is highly beneficial, particularly for adhering to regulations. In some implementations, knowing the real-time weight of the vessel (and the transport vehicle) is also highly beneficial for adhering to regulations, particularly road weight and bridge weight restrictions.

The weight of the contents of a vessel can be calculated from the volume of the contents, measured as described above, and the specific density of the contents. As indicated above, the monitoring system for monitoring contents in a vessel 200 may include a sensor to determine the specific density, e.g., as part of the device 202, or as part of the measuring system 302. The other systems described herein would be adjusting accordingly. For example, the discrepancy notification system 304 could include a weight calculating module present in memory 344 and executable by the processor 346. The calculated weight could be provided to the notification module 342 or other notification module to determine whether the calculated weight exceeds a regulatory limit.

The above specification provides a complete description of the structure and use of exemplary implementations of the invention. The above description provides specific implementations. Features and/or elements may be interchanged among the various implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, any numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method for monitoring contents located inside a vessel traveling along a route from a first location where the contents are delivered into said vessel, to a destination location where the contents are withdrawn from said vessel, said method comprising the steps of:
   receiving a first volumetric data representing a first volume of said contents located inside said vessel at said first location along said route;
   receiving a second volumetric data representing a second volume of the contents located inside said vessel at a second location along the route wherein said second location is between said first location and said destination location;
   calculating with a processor a volume change between the first volume and the second volume of the contents inside said vessel based on a differential between the first volumetric data and the second volumetric data; and
   triggering a notification to a user responsive to a determination that the calculated volume change exceeds a predetermined threshold.

2. The method of claim 1, wherein receiving the first volumetric data comprises calculating the first volume from a first depth measurement, and receiving the second volumetric data comprises calculating the second volume from a second depth measurement.

3. The method of claim 1, wherein receiving the first volumetric data comprises receiving a first volume measurement, and receiving the second volumetric data comprises receiving a second volume measurement.

4. The method of claim 1 further comprising:
   receiving a third volumetric data representing a third volume of the contents inside said vessel at a third location along the route, wherein said third location is between said second location and said destination location;
   calculating a second volume change between the second volume and the third volume; and
   triggering a notification to alert a user responsive to a determination that the calculated second volume change exceeds a predetermined threshold.

5. The method of claim 1 further comprising:
   receiving a third volumetric data representing a third volume of the contents inside said vessel at a third location along the route, wherein said third location is between said second location and said destination location;
   calculating a second volume change between the first volume and the third volume; and
   triggering a notification to a user responsive to a determination that the calculated second volume change exceeds a predetermined threshold.

6. The method of claim 1 further comprising:
   receiving a third volumetric data representing a third volume of the contents from inside said vessel at a third location along the route, wherein said third location is between said second location and said destination location; wherein a period between receiving the first volumetric data and the second volumetric data is different than a period between receiving the second volumetric data and the third volumetric data.

7. The method of claim 1 further comprising:
   comparing the second location with mapping data to determine whether the second location corresponds to one of a plurality of predetermined geographic features which correlates to a change detected in said second volumetric data as compared to said first volumetric data; and,
   taking additional action based on the comparison.

8. The method of claim 7, wherein the additional action comprises canceling any notification if the second location corresponds to a predetermined geographic feature expecting said change.

9. The method of claim 7, wherein in the case of a notification issuing, the additional action comprises identifying the second location as a potential leak location if the second location does not correspond to a predetermined geographic feature expecting said change.

10. The method of claim 1, wherein:
    receiving the second volumetric data representing the second volume of contents from within the vessel at the second location along the route occurs while the vessel is in transit.

11. The method of claim 1, wherein the second location is the same as the first location, and the first volumetric data representing the first volume of contents is at a first time and the second volumetric data representing the second volume of contents is at a second time later than the first time.

12. The method of claim 1, wherein the contents in the vessel comprise a first product and a second product different than the first product.

13. The method of claim 1, wherein said volume change is a volume decrease.

14. The method of claim 8 wherein said predetermined geographical feature is an elevation indicative of a mountain and said change is a decrease in volume due to increased atmospheric pressure inside said vessel.

15. The method of claim 12 and further comprising the step of providing a sensor operable to differentiate between said first and second products.

16. The method of claim 15 wherein said sensor is a guided wave radar operable to determine the dielectric constant and respective levels of said first and second products.

17. The method of claim 15 wherein said sensor is a non-contact sensor.

18. The method of claim 17 wherein said sensor is radio waves.

19. A system for monitoring contents located inside a vessel traveling along a route from a first location where the contents are delivered into said vessel, to a destination location where the contents are withdrawn from said vessel, the system comprising:
    a discrepancy notification module stored in memory and executable by a processor, the discrepancy notification module configured to:
       compare a first volumetric data representing a first volume of contents from within said vessel to a second volumetric data representing a second volume of contents from within said vessel, the first volumetric data corresponding to a first location along said route and the second volumetric data corresponding to a second location along the said route, said second location between said first location and said destination location; and
       calculate a volume change between the first volume and the second volume based on a differential between the first volumetric data and the second volumetric data, and
       trigger a notification to a user responsive to a determination that the volume change exceeds a predetermined threshold.

20. The system of claim 14, wherein the discrepancy notification module is further configured to:
- compare a third volumetric data representing a third volume of contents from within the vessel to the first volumetric data and calculate a second volume change, said third volumetric data corresponding to a third location along said route, said third location between said second location and said destination location; and
- trigger a notification to alert a user responsive to a determination that the second volume change exceeds the predetermined threshold.

21. The system of claim 14, wherein the discrepancy notification module is further configured to:
- compare a third volumetric data representing a third volume of contents from within the vessel to the second volumetric data and calculate a second volume change, said third volumetric data corresponding to a third location along said route, said third location between said second location and said destination location; and
- trigger a notification to alert a user responsive to a determination that the second volume change exceeds the predetermined threshold.

22. The system of claim 14, wherein the discrepancy notification module is further configured to:
- calculate a first volume from the first volumetric data and calculate a second volume from the second volumetric data, and
- compare the first volume to the second volume to determine the volume change.

23. The system of claim 14, wherein the discrepancy notification module is further configured to:
- receive the first volumetric data, and
- receive the second volumetric data.

24. The system of claim 14, wherein the notification is sent to a remote user.

25. The system of claim 19, wherein the notification is displayed on a screen.

26. One or more computer-readable storage media of a tangible article of manufacture encoding computer-executable instructions for executing on a computer system a computer process, the computer process operable to monitor contents located inside a vessel traveling along a route from a first location where the contents are delivered into said vessel, to a destination location where the contents are withdrawn from said vessel, said computer process comprising:
- receiving a first volumetric data representing a first volume of contents from within a vessel at said first location along said route;
- receiving a second volumetric data representing a second volume of the contents from within the vessel at a second location along the route wherein said second location is between said first location and said destination location;
- calculating a volume change between the first volume and the second volume; and
- triggering a notification to alert a user responsive to a determination that the calculated volume change exceeds a predetermined threshold.

* * * * *